DIGITAL INPUT SYSTEM
Filed June 13, 1961
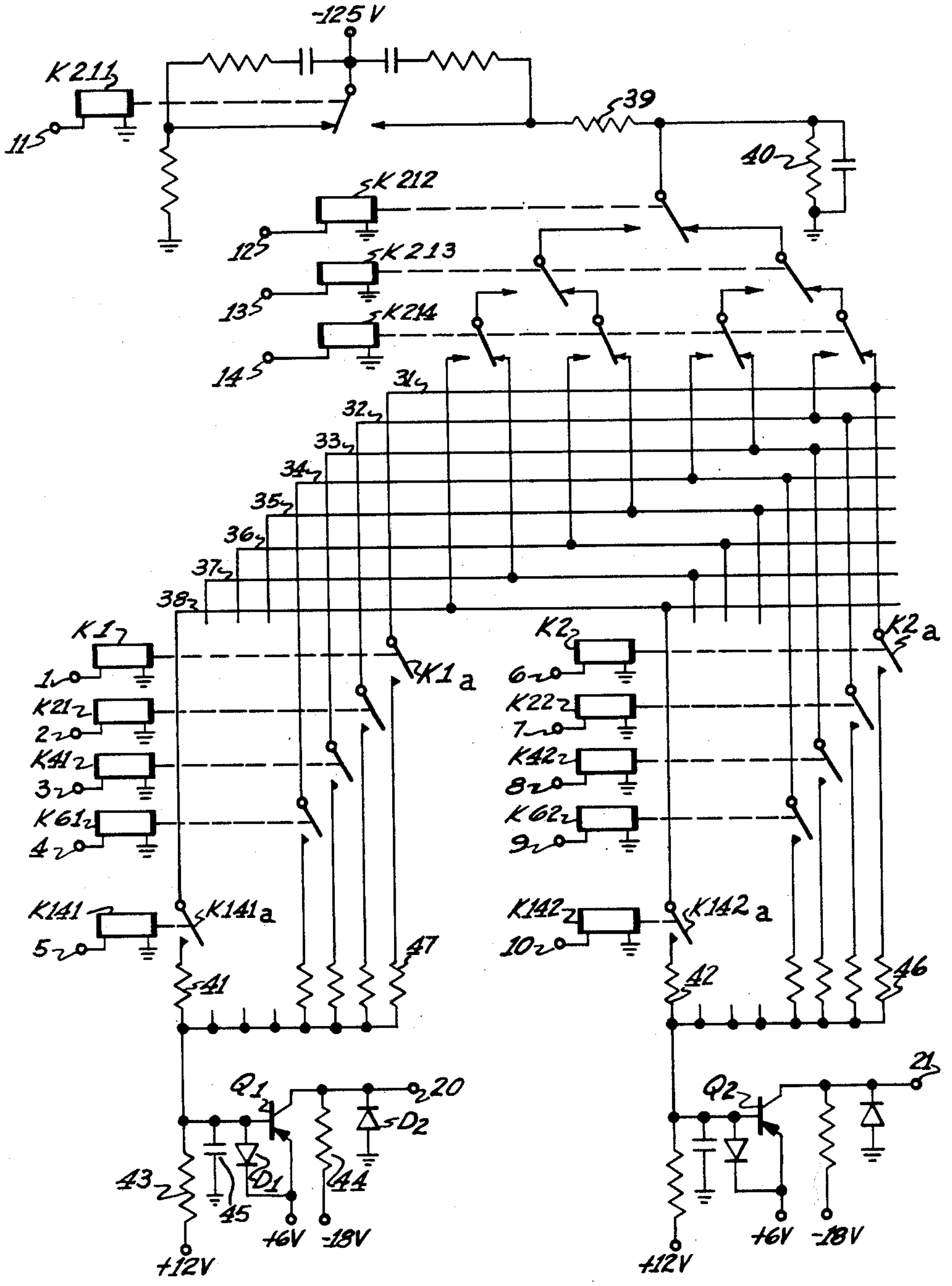
INVENTOR.
C. H. PROPSTER, JR.
BY
A. M. Fernandez 3,157,856

DIGITAL INPUT SYSTEM

Charles H. Propster, Jr., Saratoga, Calif., assignor to General Electric Company, a corporation of New York Filed June 13, 1961, Ser. No. 116,819
6 Claims. (Cl. 340—147)

This invention relates to a digital input system which utilizes a selecting circuit to transfer groups of digital signals from a number of sources to a common utilization system and more particularly to a selecting circuit which utilizes a signal translating circuit having a plurality of input terminals and a common output terminal for transferring a digital signal from a selected one of a plurality of sources to a common utilization device.

In a variety of industrial process control systems, the operating condition of many devices must often be known to determine, for example, whether they are operating in or out of limits. For that purpose appropriate digital sensors are provided for respective devices which produce digital signals that correspond to their operating condition. For instance, in monitoring a given device for proper operation, a digital sensor may be provided which produces a 0-volt signal while the device is operating properly within prescribed limits and a 24-volt signal only when it is operating out of limits. Sensors of that nature are generically referred to hereinafter as signal sources because their true nature is not a limiting factor of the present invention.

Systems which have been employed to selectively transfer digital signals in the past have included either a stepping switch or a relay matrix to scan one digital signal source at a time. If a relatively large number of signal sources are to be scanned, such as 300 or more, the time required to sequentially scan them all may be too long for the purpose for which associated devices are being monitored.

In applications where rapid transfer of a large number of digital signals is required, a system may be provided for transferring groups of digital signals in parallel, particularly those digital signals associated with critical devices which must be monitored more closely. In such a system, the digital signals from a given group of sources transferred in parallel to an electronic data processor for analysis are stored therein by a flip-flop register, or similar storage device, until they are analyzed.

In order to selectively transfer groups of digital signals to a common utilization system from a plurality of sources arranged in groups, a common transfer network is provided. In the past, asymmetrical current devices, such as diodes or triodes, have been employed as buffers in such a network to eliminate sneak circuits and thereby isolate the current paths of the various digital signals. Since one asymmetrical current device must be provided to isolate the current path of each digital signal, in an expanded system having $n$ digital signals to be transferred in groups, either $n$ asymmetrical current devices must be employed or a separate transfer circuit provided for each digital signal in a network having an $n$-point scanner.

An object of this invention is to provide an economical way of isolating current paths coupled to a common signal-translating circuit such that when one digital signal is translated, it does not interact with sources of other digital signals.

Another object is to provide an economical transfer network for selectively translating digital signals in groups to a common utilization system.

These and other objects are achieved in a novel transfer network employing a plurality of current detectors, each having a low input impedance, to translate a selected group of digital signals to output terminals, each current detector being coupled to a plurality of digital current switches by isolating resistors, each resistor having an impedance value which is large relative to the low input impedance of the current detector. In a specific embodiment, each digital current switch comprises contacts of a relay energized by a signal from an associated digital signal source such that the digital signal to be translated by the current detector is manifested by the open or closed condition of the relay contacts. However, it should be noted that a given digital switch may have the open or closed condition of its contacts controlled mechanically by its associated device. One contact of each digital current switch in a group is connected to a bus bar or common electrical conductor. As many bus bars are provided as there are distinct groups of digital signals to be selectively transferred. A group selecting circuit or scanner comprising a relay-type transfer tree is employed to selectively apply a voltage to the bus bar associated with the group of digital signals selected at random for transfer.

Other objects and advantages will become apparent from the following description with reference to drawings wherein the sole figure is a schematic diagram of a system for selectively transferring digital signals to a common utilization system.

Ten input terminals 1 to 10 adapted to be coupled to digital signal sources are connected to representative digital current switches comprising relays, such as a relay K1 having a transfer contact K1*a*. The digital signal relay switches are associated in groups by a relay transfer tree having four control terminals 11 to 14 to which digital control signals are applied to selectively transfer a group of digital signals to the common utilization system (not shown) connected to output terminals 20 and 21. For example, relays K1 and K2 comprise one group which may be selectively scanned to provide digital signals corresponding to the open or closed condition of the transfer contacts K1*a* and K2*a* at the output terminals 20 and 21, respectively. The transfer contacts K1*a* and K2*a* are connected to a bus bar 31 to which a voltage signal is selectively applied through the relay transfer tree when the group of digital signals applied to the relays K1 and K2 is to be selectively transferred. Additional bus bars 32 and 38 are provided for selectively transferring additional groups of digital signals. The additional groups illustrated are: relays K21 and K22; relays K41 and K42; relays K61 and K62; and relays K141 and K142.

Each group of digital current switches may be expanded to accommodate as many digital signals as necessary. For instance, each group of switches may include twenty relays. Since eight bus bars are illustrated, eight groups of twenty digital signals may be selectively transferred in order to monitor as many as 160 devices. If a greater number of groups are to be selectively transferred, the number of bus bars may be increased by adding relays to the transfer tree comprising relays K212, K213 and K214. For instance, the addition of one more relay having eight transfer contacts increases the number of bus bars to sixteen and thereby doubles the number of groups of digital signals which may be selectively transferred.

It should be noted that although a relay transfer tree has been illustrated for selectively connecting a voltage signal to one of a plurality of bus bars, other means may be employed, such as a relay matrix or a stepping switch having as many contacts as there are bus bars.

When all of the relays K212 to K214 are de-energized, the first group of digital signals associated with the bus bar 31 is selected for transfer. However, the digital signals manifested by the open or closed condition of the transfer contacts K1*a* and K2*a* are not translated to the output terminals 20 and 21 until a relay K211 is energized. When the relay K211 is energized by a control signal at the input terminal 11, a negative voltage signal of approximately 125 volts is coupled to the transfer tree from a voltage divider comprising a resistor 39 having a low resistance of about twenty ohms connected in series with a resistor 40 having a high resistance of about 5K ohms.

In operation, the control signals for selectively transferring a given group of digital signals is applied to the input terminals 12 to 14 before a control signal is applied to the input terminal 11, and the control signal applied to the input terminal 11 is removed before the transfer tree is actuated to select a different group of digital signals for transfer, in order to eliminate the noise which would otherwise be generated while the transfer tree is being actuated. The proper sequencing of the control signals applied to the input terminals 11 to 14 may be provided by the data processing system to which the output terminals 20 and 21 are connected.

For convenience only a two-point distributor has been illustrated to selectively transfer five groups of digital signals, each group comprising two relays having their input terminals coupled to associated digital signal sources (not shown). When the associated signal sources are operating in a given condition, the relays are in a predetermined state. For example, the relays K141 and K142 may be associated with devices having threshold detectors which provide 24-volt signals for actuating the relays when their operation exceeds a given value with respect to a particular characteristic.

As a specific example to clarify the operation of the digital current switch relays K141 and K142, assume that the devices with which they are associated are generators and that the characteristic to be monitored is the revolutions per minute (r.p.m.) of each. The threshold detectors coupling the generators to the digital relay switches may comprise a tachometer, a storage counter of the staircase-type driven by the tachometer as an r.p.m.-meter, and a voltage comparator for comparing the voltage output of the storage counter with a reference voltage corresponding to a predetermined r.p.m. For the specific example, the voltage comparator is biased to provide a 24-volt signal when the voltage output signal of the storage counter exceeds the reference voltage in order to energize the associated one of the digital-current-switch relays K141 and K142 when the corresponding generator exceeds the predetermined r.p.m. A suitable storage counter and voltage comparator are shown at pages 352 and 467, respectively, in a book by Jacob Millman and Herbert Taub titled Pulse and Digital Circuits, published by McGraw-Hill Book Company (1956).

The contact of a given digital-current-switch relay is connected to its associated current detector by a coupling resistor. For instance, the contact of the digital switch K141 is coupled to the base electrode of a transistor $Q_1$ by a resistor 41, and the contact of the digital switch K142 is coupled to the base electrode of a transistor $Q_2$ by a coupling resistor 42.

The transistors $Q_1$ and $Q_2$ are connected in a common-emitter amplifier configuration and function as current detectors having low input impedance. In operation, a current detector, such as the current detector including the transistor $Q_1$, is designed to provide a 0-volt signal at its output terminal when an open circuit is present in each of its input circuits and a +6-volt signal when a closed circuit is present in one of its input circuits.

For instance, assume that control signals are applied to the input terminals 11 to 14 to selectively transfer the last group of digital signals from the digital-current-switch relays K141 and K142, and that the relay K141 is de-energized as shown so that an open circuit exists between its transfer contact K141*a* and the coupling resistor 41. Under those conditions, the base electrode of the transistor $Q_1$ is slightly more positive than its emitter electrode connected to a +6-volt source due to current from a source of +12 volts through a resistor 43 and a diode $D_1$, thereby holding the transistor $Q_1$ cut off. While the transistor $Q_1$ is cut off, the output terminal 20 is clamped at approximately 0 volts due to current from ground through a diode $D_2$ and a resistor 44 to a source of −18 volts. If the relay K141 were energized, the base of the transistor $Q_1$ would be connected to the source of approximately −125 volts by the transfer contacts of the relays K212 to K214, the transfer contact K141*a* and the coupling resistor 41, thereby reverse biasing the diode $D_1$ and driving the base electrode of the transistor $Q_1$ below +6 volts. When the emitter of the transistor $Q_1$ is below +6 volts, the transistor conducts and reverse biases the diode $D_2$ to provide an output signal of approximately +6 volts.

The advantage of utilizing a current detector having a low input impedance in accordance with the present invention is that coupling resistors, such as the resistors 41 and 42, may be used for isolation instead of more expensive diodes or other asymmetrical current devices. The low input impedance of the transistor $Q_1$ provides a D.-C. short circuit through the +6-volt to eliminate sneak circuits to the base of the transistor $Q_2$. A capacitor 45 is provided as an A.-C. short circuit to shunt transient signals produced by the digital-current-switch contacts as they are actuated in order to protect transistor $Q_1$.

As an example of the advantage of using a current detector having a low input impedance, consider the problem of transferring the first group of digital signals when the relay K1 is de-energized and the relays K2, K141 and K142 are energized. Under those circumstances, when a 0-volt signal is applied to the control terminals 12, 13 and 14, and a 24-volt signal is applied to the control terminal 11, the relay K211 is energized and a negative signal of approximately 125 volts is applied through the bus bar 31, the closed transfer contact K2*a*, and a coupling resistor 46 to the base of the transistor $Q_2$. Because the transfer contact K1*a* is open, a negative voltage signal is not applied to the base of the transistor $Q_1$ through a coupling resistor 47 so that a 0-volt signal is produced at the output terminal 20 while a +6-volt signal is produced at the output terminal 21.

The problem of eliminating sneak circuits arises from the fact that the other digital switches may be closed as in the foregoing assumed problem. For instance, the negative voltage signal applied to the base of the transistor $Q_2$ may be transmitted through a sneak circuit comprising the coupling resistor 42, transfer contact K142*a*, transfer contact 141*a* and the coupling resistor 41 to the base of the transistor $Q_1$ to cause it to produce a +6-volt signal at the output terminal 20. However, due to the low input impedance of the transistor $Q_2$, the negative voltage signal applied to the base of the transistor $Q_1$ through that sneak circuit path is insufficient to overcome its cut-off bias. Thus, the provision of a low impedance current detector obviates the asymmetrical current devices employed in the past to isolate current sources coupled to a common utilization device.

It should be noted that the low impedance current detectors comprising the common-emitter connected transistor $Q_1$ and $Q_2$ are only illustrative and that the other types of current detectors having low input impedance may be employed. A specific embodiment of a current detector as illustrated includes, by way of example, a PNP transistor of a type intended for medium-speed general-purpose applications and similar to the 2N219 transistor manufactured by the Radio Corporation of America. The two diodes $D_1$ and $D_2$ are made of germanium and silicon, respectively. The bias resistors 43 and 44 are 6.8K and 1.8K ohms, respectively, and the coupling resistors, such as the resistor 41, are all selected to be 39K ohms.

While the principles of the invention have not been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. For instance, as noted hereinbefore, the digital switches illustrated are relays actuated by electrical signals derived from devices being monitored, but any switch actuated by a mechanical analog of the electrical signals applied to the relay-type digital switches may be employed. The appended claims are therefore intended to cover and embrace any such modifications, within the limits only of the true spirit and scope of the invention.

What is claimed is:

1. A scanning device comprising: a plurality of input terminals; a plurality of series circuits one for each input terminal, each series circuit having two terminals and comprising a current switch and an impedance element, one terminal being connected to a respective one of said input terminals; a source of reference potential, a current detecting means having an input terminal connected to the second terminal of each of said series circuits and an output terminal for producing an output signal in response to an input current signal through any one of said impedance elements, said current detecting means having a low input impedance relative to the impedance of a given one of said impedance elements, whereby a current signal through any one of said impedance elements is substantially short-circuited to said source of reference potential; a source of potential; means for selectively connecting said source of potential to one of said input terminals; and a plurality of actuating means coupled to said current switches, one actuating means for each current switch for rendering it conductive.

2. A scanning device comprising: a plurality of input terminals; a plurality of series circuits, one for each input terminal, each series circuit having two terminals and including a current switch and an impedance element, one terminal being connected to a respective one of said input terminals; a common-emitter-connected transistor amplifier including a transistor connected in a common-emitter amplifier configuration, its base electrode being connected to the second terminal of each said series circuits and its collector electrode being coupled to an output terminal for producing an output signal in response to an input current signal through any one of said impedance elements connected to said base electrode, said common-emitter-connected transistor amplifier having a low input impedance relative to the impedance of a given one of said impedance elements, whereby a current signal through any one of said impedance elements is substantially short-circuited to said source of emitter bias potential; a source of potential of a given polarity selected to render the said transistor conductive when applied to its base through one of said impedance elements; means for selectively connecting said source of potential to one of said input terminals; and a plurality of actuating means coupled to said current switches, one actuating means for each current switch for rendering it conductive.

3. In a system for selectively transferring groups of digital signals to a common utilization device, wherein said digital signals are manifested by the conductive condition of current switches, the combination comprising: a plurality of current switches arranged in equal groups, each current switch having an input and an output terminal; a plurality of bus bars, one for each group of current switches connected to the input terminal of the current switches thereof; a plurality of impedance elements, one for each current switch, each impedance element having a first terminal connected to the output terminal of its associated current switch and a second terminal; a group of current detectors, one for each current switch of a given group of current switches, each having an input terminal, an output terminal, and low input impedance relative to the impedance of a given one of said impedance elements; means for connecting the second terminal of the impedance elements connected to a different one of said current switches in each group to a corresponding one of said current detectors; a source of potential; and means for selectively connecting said source of potential to one of said bus bars, whereby a group of digital signals manifested by the conductive condition of a group of current switches connected to the selected one of said bus bars and coupled to corresponding ones of said current detectors by associated impedance elements is translated into a group of voltage signals at output terminals of said current detectors and a digital signal translated into a current signal at an input terminal of a given current detector is substantially short-circuited to a source of reference potential.

4. In a system for selectively transferring groups of digital signals to a common utilization device, wherein said digital signals are manifested by the conductive condition of current switches, the combination comprising: a plurality of current switches arranged in equal groups of at least two switches, each current switch having an input and an output terminal; a plurality of bus bars, one associated with each group of current switches, each one being connected to the input terminal of the current switches associated therewith; a plurality of impedance elements, one for each current switch, each impedance element having a first terminal connected to the output terminal of its associated current switch and a second terminal; a plurality of transistor amplifiers, one for each current switch of a given group of current switches, each amplifier including a transistor connected in a common-emitter amplifier configuration having an input terminal connected to the base electrode, an output terminal connected to the collector electrode, and a low input impedance through the base and emitter circuits relative to the impedance of a given one of said impedance elements; means for connecting the second terminal of the impedance elements connected to a different one of said current switches in each group to the input terminal of a corresponding one of said common-emitter transistor amplifiers; a source of potential of a given polarity selected to render a given one of said transistor amplifiers conducted when applied to its input terminal through one of said impedance elements; a means for selectively connecting said source of potential to one of said bus bars whereby a group of digital signals manifested by the conductive condition of a group of current switches connected to the selected one of said bus bars and coupled to said common-emitter transistor amplifiers by associated impedance elements is translated into a group of voltage signals at output terminals thereof and a digital signal translated into a current signal at an input terminal of a given common-emitter transistor amplifier is substantially short-circuited through the base and emitter circuits thereof.

5. In a system for selectively transferring groups of $n$ digital signals to a common utilization device, wherein said $n$ digital signals are manifested by the conductive condition of a selected group of $n$ current switches, the combination comprising a group of $n$ common-emitter transistor amplifiers each having an output terminal adapted to be connected to said utilization device and an input terminal; a plurality of groups of $n$ current switches, each current switch of a given group having an output terminal coupled to a different one of said amplifiers and an input terminal; a plurality of actuating means, one actuating means coupled to each current switch for rendering it conductive; a plurality of bus bars, one for each group of current switches connected to the input terminal of the current switches thereof; a source of potential of a given polarity selected to render a given one of said transistor amplifiers conductive when applied to its input terminal through one of said impedance elements; and means for selectively connecting said source of potential to one of said bus bars, whereby a group of digital signals manifested by the conductive condition of a group of *n* current switches connected to the selected one of said bus bars and coupled to corresponding ones of said transistor amplifiers by associated impedance elements is translated into a group of voltage signals at output terminals of said transistor amplifiers and a current signal translated to an input terminal of a given transistor amplifier is substantially short-circuited by the base and emitter circuits thereof.

6. In a system for selectively scanning a plurality of bidirectional-conductive switches and transferring in parallel a selected group of digital signals manifested by the conductive condition of associated switches to a common utilization device, the combination comprising: a plurality of switches arranged in equal groups, each switch having an input terminal, an output terminal, and a control element; a plurality of actuating means, one actuating means connected to the control element of each switch for rendering it conductive between its input and output terminals; a plurality of bus bars, one for each group of switches connected to the input terminal of the switches thereof; a plurality of common-emitter transistor amplifiers, one for each switch in a given group, the transistor of each amplifier having an input terminal connected to its base electrode, an output terminal connected to its collector electrode and sources of bias potential connected between its emitter and base electrodes and between its emitter and collector electrodes; a plurality of impedance elements, one for each switch, each impedance element being serially connected between the output terminal of its associated switch and the input terminal of a corresponding one of said amplifiers; a source of potential of a given polarity selected to render a given one of said amplifiers conductive when applied to its input terminal through one of said impedance elements; and means for selectively connecting said source of potential to one of said bus bars whereby a selected group of digital signals manifested by the conductive condition of a group of switches connected to the selected one of said bus bars is translated into a group of voltage signals at output terminals of said amplifiers and a current signal at an input terminal of a given amplifier is substantially short-circuited through the base and emitter circuits thereof.

References Cited by the Examiner

UNITED STATES PATENTS

| | | | |
|---|---|---|---|
| 2,386,482 | 10/45 | Leathers et al. | 340—147 |
| 2,627,039 | 1/53 | MacWilliams | 340—147 |
| 2,628,277 | 2/53 | Spencer | 340—147 |

FOREIGN PATENTS

| | | |
|---|---|---|
| 1,238,923 | 7/60 | France. |

NEIL C. READ, *Primary Examiner.*